CIRCUIT ARRANGEMENT IN COLOUR TELEVISION RECEIVERS

Filed Aug. 20, 1964

INVENTOR.

GERRIT KOOL

Frank R. Trifari

AGENT 3,342,930
Patented Sept. 19, 1967

3,342,930

CIRCUIT ARRANGEMENT IN COLOUR TELEVISION RECEIVERS

Gerrit Kool, Emmasingel, Eindhoven, Netherlands, assignor to North American Philips Company, Inc., New York, N.Y., a corporation of Delaware Filed Aug. 20, 1964, Ser. No. 390,812
Claims priority, application Netherlands, Aug. 30, 1963, 297,330
7 Claims. (Cl. 178—5.4)

This invention relates to circuits for colour television receivers for receiving colour television signals of the type in which two colour signals are modulated in quadrature on an auxiliary carrier and the burst signal is co-transmitted as a separate synchronizing signal during the occurrence of a back porch between two lines. Such circuits include an amplifying element in the colour channel of the receiver which amplifies both the burst signal and the colour signal present during the rest of a line period and which has gating pulses applied to it which open the amplifying element further during the horizontal fly-back period than during the horizontal stroke period T. The gating pulses are derived from an output electrode of a second amplifying element to the input electrode of which the gating pulses are applied. The circuit also includes means for deriving an automatic control voltage, proportional to the amplitude of the burst signal, from the output signal of the first-mentioned amplifying element.

In the majority of known colour television receivers a voltage for the automatic colour control (ACC) in the colour channel is produced separately and applied for control to one or more amplifying elements in the colour channel, said voltage maintaining the amplitude of the output signal of the colour channel as constant as possible.

Such receivers usually also include a contrast control which reacts, however, only on the luminance signal Y. In such receivers, upon control of the contrast, the amplitude of the luminance signal Y is varied but the amplitude of the colour signal is not varied. This results in wrong display of the colour image for if the amplitude of the luminance signal Y is increased without simultaneously increasing the amplitude of the colour signal, the saturation of the colours is decreased and, conversely, greater saturation occurs if the amplitude of the luminance signal Y is decreased with constant amplitude of the colour signal.

Thus the best receivers are those in which both the amplitude of the luminance signal Y and the amplitude of the colour signal are varied by means of the contrast control. This is possible, for example, by varying the D.C. adjustment of that circuit in the receiver which produces the automatic volume control (AVC) voltage for the common intermediate-frequency portion of the receiver (in which the non-detected colour television signal which includes information about the colour as well as the luminance is amplified).

However, it will be evident that it is then not possible for separate ACC voltage to be active in the colour channel itself for maintaining the amplitude of the colour signal constant since the influence of the contrast control would then be neutralized by the ACC voltage in the colour channel.

Besides, in many modern type receivers, the burst signal present for synchronization purposes, which burst signal, for example, in the television signal composed by the National Television System Committee (NTSC) is co-transmitted on the back porch of the line synchronizing signal and has the same frequency as the auxiliary carrier is also amplified in the colour channel itself. The synchronous demodulator in which that portion of the colour modulation is demodulated which is modulated on the auxiliary carrier at a phase angle of 90° with respect to the phase angle at which the burst signal is co-transmitted also supplies a control voltage for the frequency control of the local oscillator from which the regenerated subcarrier signal may be derived.

If the colour channel includes no control circuit at all the control signal derived from the said synchronous demodulator also varies in amplitude when the contrast is controlled, in other words in this case the phase of the local oscillator for producing the auxiliary carrier signal could vary upon control of the contrast. It will be evident that this is an undesirable situation since colour faults might result when the contrast of the image is controlled.

According to the invention the control voltage is applied as an automatic burst control (ABC) voltage to the second amplifying element. The output electrode of the second element is connected through a clamp circuit to an input electrode of the first-mentioned amplifying element variable bias at which the gating pulses derived from the second amplifying element must be fixed during the horizontal stroke period is applied to the clamp circuit.

As is well-known, colour television receivers must also be suitable readily to receive a black-white television signal. In this case the colour channel must be blocked lest undesirable colour patterns appear on the screen of the display tube.

However, since the circuit arrangement according to the invention includes a clamp circuit by which the pulses applied to the first-mentioned amplifying element in the colour channel are fixed at an adjustable bias during the occurrence of the colour signals, steps must be taken to ensure, that, if the burst signal is absent, which will naturally be the case upon reception of a black-white signal, the said bias is varied so that the amplifier is cut off during the horizontal fly-back period.

The aforementioned steps consist in that an ohmic resistor is included between the supply terminal of the voltage source from which the variable bias for the clamp circuit is derived and an electrode of the switching element in the clamp circuit to which the said bias has to be applied.

In order that the invention may be readily carried into effect, it will now be described in detail, by way of example, with reference to one embodiment thereof, shown in the acompanying diagrammatic drawing, in which.

Figures 1, 2:
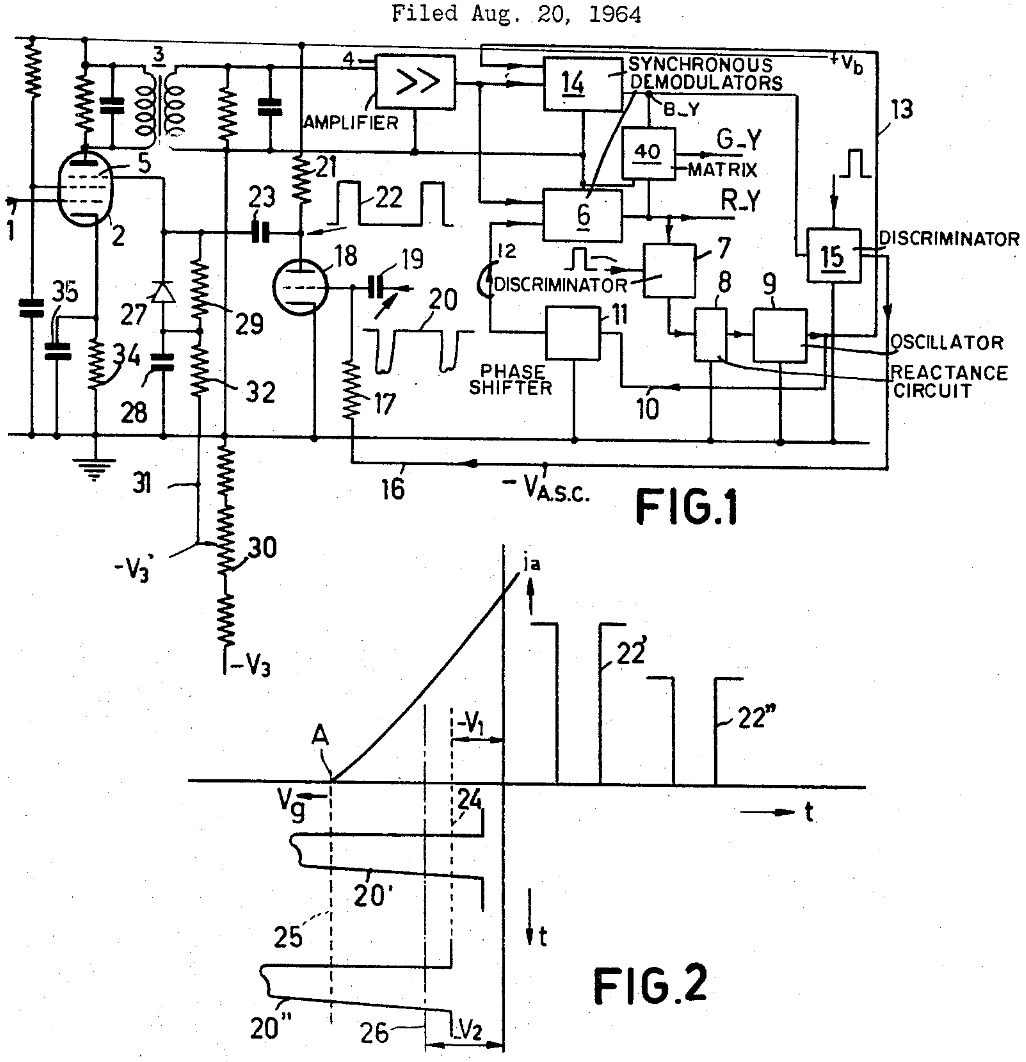
FIGURE 1 is a circuit diagram of a circuit according to the invention.
FIGURE 2 shows a current-voltage characteristic of the second amplifying element in the circuit of FIG. 1.

In FIGURE 1 the colour signal which has been detected once and filtered out is applied through a lead 1 to a tube 2 which constitutes the first amplifying element mentioned in the preamble. The colour signal applied through the lead 1 contains information about the colour during the horizontal stroke period and information about the burst signal which is co-transmitted for synchronisation on a back porch in the original television signal occurring after the line synchronizing pulse, during the horizontal fly-back period. The amplifying tube 2 thus amplifies the colour signals as well as the said burst signal. The anode of tube 2 includes a circuit 3 which is turned to the frequency of the auxiliary carrier so that the signal at the input of an amplifier 4 contains only information about the colour signal and the burst signal and no information about the gating pulses applied to a second control-grid 5 of the amplifying tube 2. The input signal of the amplifier 4 is amplified in this amplifier and then applied to a first synchronous demodulator 6 which demodulates the colour signal in a direction which differs by 90° from the direction in which the sub-carrier signal is co-transmitted for synchronization. In the NTSC system referred to, this means that the so-called red colour-difference signal $R-Y$ appears at the output of the demodulator 6, which signal may be applied to a control electrode of a colour display tube (not shown in FIGURE 1).

The output signal from the first synchronous demodulator 6 during the horizontal fly-back period also includes a control signal having a value which is dependent on the amplitude of the burst signal and on the difference in phase between the signal produced by a local oscillator 9 and the burst signal. The control signal derived from the demodulator 6, after being compared with black level in a first discriminator stage 7 which is active only during the horizontal fly-back period by means of line fly-back pulses applied thereto, is applied to a reactance circuit 8 which can readjust the frequency of the local oscillator 9 by means of the said control signal. The regenerated sub-carrier signal is derived from the local oscillator 9 and applied through a lead 10 to a phase-shifting network 11 in which the phase of the regenerated sub-carrier signal is shifted in phase by 90° so as to become co-phasal with the phase angle at which the red colour-difference signal is modulated on the auxiliary carrier. The output signal from 11 may thus be applied through a lead 12 to the synchronous demodulator 6 to bring about therein the desired synchronous demodulation.

The output signal from the local oscillator 9 is also applied through a lead 13 to a first input terminal of a second synchronous demodulator 14. The colour signal derived from the amplifier 4 is applied to the second input terminal of demodulator 14. The phase of the signal applied through the lead 13 has not been shifted so that the second synchronous demodulator demodulates in a direction which differs by 90° from the direction of demodulation in the first synchronous demodulator 6. Upon demodulating a television signal received by the NTSC system, the blue colour-difference signal $B-Y$ appears at the output of the amplifier 14 and also a negative signal which is proportional to the amplitude of the burst signal. The said negative output signal is also compared with black level or another level, for example earth potential, in a second discriminator stage 15 which is also active only during the horizontal fly-back period, so that a negative control voltage which is proportional to the amplitude of the burst signal may be derived from the output of the second reference stage 15. The green color difference signal $(G-Y)$ is derived from a matrix circuit 40 connected to the demodulators 6 and 14.

It is to be noted that, although in the foregoing it is stated that the phase of the regenerated sub-carrier signal is shifted in phase by 90° in the network 11 so that the first synchronous demodulator 6 demodulates in a direction which differs by 90° from the direction in which the second demodulator 14 demodulates, this is not strictly necessary. It is alternatively possible to demodulate in two directions which differ by less than 90° and then add together the output signals from the two demodulators in a matrix circuit so as to obtain substantially the red colour difference signal $(R-Y)$, the blue colour difference signal $(B-Y)$ and the green colour difference signal $(G-Y)$. The red colour difference signal $(R-Y)$ at the output of the matrix circuit will then be identical with the output signal from the first synchronous demodulator 6 in the embodiment of FIGURE 1. This output of the matrix circuit may thus be connected to the input of the first reference stage 7, in order to obtain the same control signal as in the case of FIGURE 1.

In a similar manner it may be demonstrated that, if the input of the second discriminator stage 15 is connected to that output of the matrix circuit from which the blue colour difference signal $(B-Y)$ is derived, the output voltage of the stage 15 will be the same as in the embodiment of FIGURE 1. When using two demodulators and a matrix circuit the important point is therefore the signal ultimately obtained after demondulation.

The negative signal derived from the second discriminator stage 15 and indicated as $-V_{ASC}$ in FIGURE 1 is applied through a lead 16 and a grid resistor 17 to the control grid of a triode 18 which constitutes the second amplifying element referred to in the preamble. A signal 20 originating from the horizontal output transformer is applied to the control grid of the triode 18 through a capacitor 19 so that the signal 20 contains the line fly-back pulses. These line fly-back pulses are applied to the control grid with negative polarity so that positive fly-back pulses 22 which appear across an anode resistor 21 of the tube 18 have flat tops, as can be seen from FIGURE 1, instead of distorted tops as may be seen from the voltage indicated by 20. This is a necessary condition because the gating pulses 22 are applied through a capacitor 23 to the control grid 5 of the first-mentioned amplifying element 2 and must assume there a fixed level during the whole fly-back period. If the gating pulses 22 were distorted such as the gating pulses 20 there could be no question of a fixed level occurring during the whole fly-back period.

The manner in which the proper fly-back pulses 20 in the triode 18 are obtained and the manner in which it may be ensured that the desired variation in amplitude of the pulses 22 occurs by means of the applied control voltage $-V_{ASC}$ may be clarified with reference to FIGURE 2.

FIGURE 2 illustrates the anode current-grid voltage characteristic ($i_a-V_g$ characteristic) of the triode 18 and also at the left below the input signal 20 for two values of the control voltage $-V_{ASC}$. The pulse indicated by 20′ in FIGURE 2 corresponds, for example, to a value of $-V_1$ volts, determined by the automatic burst control (ABC) voltage as indicated by line 24 in FIGURE 2. The input pulse 20′ will thus fluctuate about the mean value indicated by line 24 as shown in FIGURE 2. Since point A indicates the cut-off voltage of the triode 18 it will be evident that no anode current $i_a$ can flow before that portion of the pulse 20′ which lies to the left of line 25. Thus, the anode current caused by the control of the pulse 20′ will have a wave form as indicated by pulse 22′ at the right in FIGURE 2.

If, however, the voltage for the automatic burst control is increased to a value of $-V_2$ volts as indicated by the dot-and-dash line 26 in FIGURE 2, the mean value of the control pulse 20 will now fluctuate about the level indicated by line 26 as indicated by the pulse 20″ at the left below in FIGURE 2. As before, no anode current can flow before the portion of the pulse 20″ located to the left of line 25 so that the anode current caused by the pulse 20″ will have a waveform as shown by the pulse 22″ as the right in FIGURE 2. The pulses 22′ and 22″ cause pulses of positive polarity across the anode resistor 21 and it will be evident that, since the amplitudes of the pulses 22′ and 22″ are different the pulses across the anode resistor 21 will also have different amplitudes as the negative voltage at the control grid of tube 18 varies. Thus, the amplitude of the pulses 22 will be smaller as the negative control voltage $-V_{ASC}$ at the control grid of tube 18 is higher.

According to the invention the grid lead of the second control-grid 5 includes a clamp circuit comprising a diode 27, which is active as a switching element, a capacitor 28, an ohmic resistor 29, which is connected in parallel with the diode, and a negative voltage source comprising a resistor 30 which has a variable tapping 31 and to which a negative voltage of $-V_3$ volts is applied. The said clamp circuit also includes an ohmic resistor 32, the significance of which will be explained hereinafter.

By means of the variable tapping 31 it is possible to adjust a negative voltage $-V_3'$ which will also be active at the anode of the diode 27 if no current flows through the resistor 32. Since positive gating pulses are applied through the capacitor 23 to the cathode of diode 27 it will be evident that the minimum values for the gating pulses 22 are fixed at the negative voltage which will prevail at the anode of diode 27. Since these minimum values occur during the horizontal stroke period, the level assumed by the gating pulses during the horizontal stroke period will be fixed at the voltage which prevails at the tapping 31.

Figure 3:
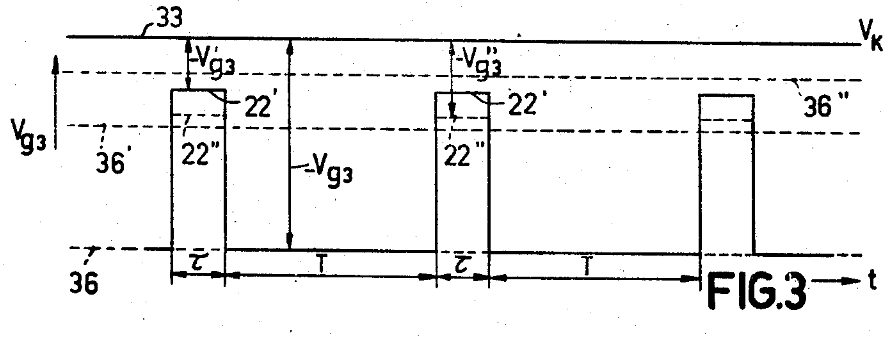
FIGURE 3 shows the gating pulses as applied to a control electrode of the first-mentioned amplifying element in the colour channel.

The foregoing may be more clarified with reference to FIGURE 3 which shows the gating pulses 22 active at the second control-grid 5. In this figure, line 33 indicates the voltage $V_k$ at the cathode of the first amplifying tube 2. The cathode lead of the tube 2 includes a network comprising a cathode resistor 34 and a smoothing capacitor 34 so that the cathode voltage $V_k$ will be slightly positive with respect to earth. This has been done to give the tube 2 the proper adjustment of its working-point for the colour signal applied through the lead 1.

Since $V_k$ is slightly positive with respect to earth the potential difference $-V_{g3}$ between the lines 33 and 36 in FIGURE 3 will be equal to the sum of the voltage across the resistor 34 and the absolute value of the voltage $V_3'$ at the tapping 31. As can be seen from FIGURE 3, the line 36 coincides with the minimum value of the gating pulses 22, which minimum value occurs during the horizontal stroke period. That is to say, the voltage level at the control grid 5 during the horizontal stroke period is fixed due to the action of the clamp circuit, at the value $-V_{g3}$ irrespective of the magnitude of the amplitudes of the gating pulses 22 which value, as explained hereinbefore, is dependent on the voltage $V_k$ across the resistor 34 and the adjusted voltage $-V_3'$.

If the gating pulse 22 has an amplitude as indicated by 22' in FIGURE 3, which amplitude is naturally determined by the amplitude of the current pulses 22' shown in FIGURE 2, this implies that the voltage between the cathode of tube 2 and the control grid 5 will have a value $-V_{g3}'$, whereas if the amplitude of the gating pulses 22 is determined by the value 22'' as shown in FIGURE 3, which value 22'' naturally again corresponds to the value 22'' shown in FIGURE 2, the negative voltage between the cathode and the control grid 5 will be equal to $-V_{g3}''$. As may clearly be seen from FIGURE 3, the voltages $-V_{g3}'$ and $-V_{g3}''$ are active only during the horizontal fly-back period.

Now it is known that the signal applied to the first control grid of a multigrid tube is amplified with a slope which is determined by the negative voltage prevailing at the second control grid of such a multigrid tube. From the considerations held with reference to FIGURE 3 it follows that, during the horizontal stroke period, the negative voltage at the control grid 5 always assumes a fixed negative value, determined by the position of the tapping 31, whereas the negative voltage at the control grid 5 during the horizontal fly-back period $\tau$ is determined by the automatic control voltage $-V_{ASC}$ at the control grid of tube 18, for if the ASC-voltage has a value as given by $-V_1$ in FIGURE 2, the negative voltage between the control grid 5 and the cathode of tube 2 during the horizontal fly-back period will be $-V_{g3}'$ volts. If, however, the value of $-V_{ASC}$ is $-V_2$ volts as determined by line 26 in FIGURE 2, the negative voltage between the control grid 5 and the cathode during the horizontal fly-back period will be $-V_{g3}''$ volts. From this it follows that the burst signals present during the horizontal fly-back period are amplified one time with a greater slope, namely if the voltage between the control grid 5 and the cathode is $-V_{g3}'$ volts, and the other time with a smaller slope, namely if the said control-grid voltage is $-V_{g3}''$ volts.

The amplitude of the burst signal present during the horizontal fly-back period $\tau$ is thus maintained constant because the burst signal has to be amplified with a smaller gain as its amplitude increases, so that in this case a slightly greater negative control voltage is developed which reduces the gain and hence the amplification of the burst signal. The colour signals, however, which occur during the horizontal stroke period are always amplified with the same gain so that, if the amplitude of the colour signals is increased due to the contrast control, they are actually applied with increased amplitude to the inputs of the synchronous demodulators 16 and 14. It is thus ensured that, due to the contrast control, both the luminance signal Y and the colour signal increase or decrease in the same ratio while still maintaining the amplitude of the burst signal substantially constant.

It will be evident that the level of line 36 may be displaced by shifting the tapping 31. The saturation of the displayed colour image is thus adjustable by means of the tapping 31 since the amplification of the colour signals may be varied by displacing the level determined by line 36.

The circuit shown in FIGURE 1 is adjusted so that the tops of the gating pulses 22 shown in FIGURE 3 always lie above the level at which the displayed colours have their proper saturation. Let it be assumed, for example, that line 36' in FIGURE 3 indicates the level at which the amplification of the colour signals during the horizontal stroke period become so high that the amplitudes of the colour signals such as become available after synchronous demodulation are increased so that the displayed colour image has its proper saturation. In this case the automatic burst control can still be active since the tops of the pulses 22 lie above the level indicated by line 36'. If, however, the correct saturation were determined by the level indicated by line 36'' it will be evident that, since line 36'' lies above the highest tops of the signal 22, the automatic burst control can no longer be active at all since the gating pulses now no longer determine the level at the control grid 5, but this level is solely determined by the value of the voltage at the tapping 31. Since this is an undesirable situation because in this case the amplitude of the sub-carrier signal would again depend on the adjustment of the contrast, it is necessary to ensure that the automatic burst control can never become inoperative which will be the case if the level of the correct saturation actualy comes to lie below the tops of the signal 22, that is to say does not exceed the level indicated by line 36'.

As previously set out in the preamble, upon reception of a black-white signal, the tube 2 has to be completely cut off during a horizontal stroke period T (see FIGURE 3) but must be open during the horizontal fly-back period $\tau$. This is not possible in the circuit arrangement of FIGURE 1 without the additional resistor 32 since despite the fact that the gating pulses 22 greatly increase in amplitude due to the negative voltage $-V_{ASC}$ at the control grid of tube 18 falling out, these gating pulses would still be fixed at the level determined by line 36 due to the action of the clamp circuit, which level is preferably not so high that the tube 5 is cut off. This is made possible, however, by the provision of the resistor 32, for if the negative voltage at the control grid of the tube 18 disappears the amplitude of the gating pulses 22 now increases to the level determined by line 33, at which level grid current starts to flow to the control grid 5 and thus through the resistor 32, the parallel combination of the triode 27 and the resistor 29, and the control grid 5 to the cathode of tube 2. This current will cause a voltage drop across the resistor 32 such that the anode of the diode 27 becomes greatly negative with respect to the voltage at the tapping 31, which negative voltage is retained by the capacitor 28 during the period in which no grid current flows. This means that the level at which the minimum value for the gating pulses 22 is fixed, that is to say the level determined by line 36, has been displaced to a large negative-going value, and for sufficiently high values of the maximum amplitude of the pulses 22 and of the resistor 32 the said value may be such that the tube 2 is cut off by the negative voltage which then prevails at the control grid 5 during the horizontal stroke period T, that is to say the tube 2 is cut off during the horizontal stroke period T and remains open during each horizontal fly-back period $\tau$. Consequently, when a colour signal is again received together with a burst signal the latter can always penetrate through the tube 2 to the synchronous demodulator 6 and thus produce the desired control voltage for the oscillator 9 and also produce the desired negative voltage $-V_{ASC}$ through the synchronous demodulator 14 and the discriminator stage 15, in order to decrease the amplitude of the pulses 22 and thus make the tube 2 suitable again for the amplification of colour signals.

Although in the above described circuit the control signal for the oscillator 9 is derived from the first synchronous demodulator 6 and that the control signal $-V_{ASC}$ is derived from the output signal of the second synchronous demodulator 14, it will be evident that this way of producing the said signals is not strictly necessary for the principle of the invention. The main point is only that the colour signal and the burst signal which is present for synchronisation are amplified in a common amplifier and that automatic control must not be exerted on the colour signal but on the burst signal. It is in principle unimportant for the inventive idea what happens further with the signal thus amplified. The main point is only that a control signal for the local oscillator 9 and a control voltage $-V_{ASC}$ are derived from the amplified signal somewhere in the receiver.

Also is it unimportant in which manner the common contrast control for the luminance signal and the colour signal is obtained. In the preamble it has been explained that this may readily be affected by control of the automatic volume control (AVC) for the common intermediate-frequency portion in which both the luminance signal Y and the colour signal are amplified on intermediate-frequency level. However, it will be evident that other methods of contrast control are also possible, for example, that in which the detected intermediate-frequency signal, which still contains information about the colour and the luminance, is subjected to contrast control. In this case also the amplitude of the colour signal, due to the contrast control will undergo a variation which will be proportional to the variation in the luminance signal and this amplitude variation in the colour signal must not be neutralized.

It is further to be noted that, although in the embodiment of FIGURE 1 the tube 2 has been described as a multi-grid tube and the tube 18 as a triode, the tube 2 may also be a triode which must naturally have a control characteristic (variable $\mu$ characteristic). In this case the cathode of the diode 27 must be connected to the single control-grid of this triode and the colour signal originating from the lead 1 and the gating pulses 22 originating from the triode 18 must be applied to the same control grid. The superposition of the said signals may be enhanced, if desired, by adding further resistors. If the said triode has a control characteristic its operation will otherwise be identical with that of the multigrid tube 2 described with reference to the embodiment of FIGURE 1.

What is claimed is:

1. A circuit for a colour television receiver for receiving colour television signals of the type in which two colour signals are modulated in quadrature on an auxiliary carrier and the burst signal is co-transmitted as a separate synchronizing signal during the occurrence of a back porch between two lines, said circuit including an amplifying element in the colour channel of the receiver for amplifying both the burst signal and the colour signal which is present during the rest of the line period, means applying gating pulses to said amplifying element which open it further during the horizontal fly-back period than during the horizontal stroke period, said gating pulses being derived from an output electrode of a second amplifying element having an input electrode to which the gating pulses are applied, the circuit also including means for deriving an automatic control voltage, proportional to the amplitude of the burst signal, from the output signal of the first-mentioned amplifying element wherein the improvement comprises means for applying said control voltage as an automatic burst control voltage to the second amplifying element, a clamp circuit, means connecting the output electrode of said second amplifying element to an input electrode of said first mentioned amplifying element by way of said clamp circuit, a source of a variable bias voltage at which the gating pulses derived from the second amplifying element must be fixed during the horizontal stroke period, and means applying said bias voltage to said clamp circuit, whereby in the absence of burst signals current flow in said input circuit resulting from said gating pulses charges said clamp circuit to a potential that cuts off said first mentioned amplifying element during the stroke period.

2. In a color television receiver for the reception of color television signals of the type having first and second color signals modulated in quadrature on an auxiliary carrier wave and occurring between periodic synchronization signals, and wherein said synchronization signals include a burst of a reference signal of the frequency of said auxiliary carrier wave when said color signals are present; an amplifier having an input circuit and an output circuit, a source of said television signals, means connecting said source to said input circuit, a source of gating pulses synchronized with said burst of said reference signal, means connected to said output circuit for producing a control voltage having an amplitude proportional to the amplitude of said burst of said reference signal in said output circuit, means for varying the amplitude of said gating pulses with said control voltage, means applying said amplitude varied gating pulses to said input circuit, whereby the amplitude of said burst in said output circuit is maintained constant, and clamp circuit means connected to said input circuit whereby the amplification of said amplifier is greater for said burst of said reference signal than for said modulated carrier wave and said amplification of said modulated carrier wave is independent of said amplification of said burst of said reference signal, said clamp circuit means comprising means for storing a charge resulting from conduction in said amplifier due to said gating pulses, whereby said amplifier is cut-off during the stroke period when said burst of said reference signal is absent.

3. In a color television receiver for the reception of color television signals of the type having first and second color signals modulated in quadrature on an auxiliary carrier wave and occurring between periodic synchronization signals, and wherein said synchronization signals include a burst of a reference signal of the frequency of said auxiliary carrier wave when said color signals are present, a first amplifier having an input circuit and an output circuit, a source of said television signals, means connecting said source to said input circuit, a source of gating pulses synchronized with said burst of said reference signal, means connected to said output circuit for producing a control voltage having an amplitude proportional to the amplitude of said burst of said reference signal in said output circuit, a second amplifier, means applying said gating pulses and control voltage to said second amplifier to produce gating pulses that have amplitudes that vary with said control voltage, means applying said amplitude varied gating pulses to said input circuit, whereby the amplitude of said burst in said output circuit is maintained constant, and clamp circuit means connected to said input circuit whereby the amplification of said amplifier is greater for said burst of said reference signal than for said modulated carrier wave and said amplification of said modulated carrier wave is independent of said amplification of said burst of said reference signal, said clamp means comprising means for storing a charge resulting from current flow in said first amplifier due to said gating pulses when said burst of reference signal is absent, whereby said first amplifier is cut-off during the stroke period when said burst of reference signal is absent.

4. The receiver of claim 3 in which said first amplifier is a multigrid tube having first and second control grids, comprising means for applying said television signal to said first grid, and means for applying said amplitude varied gating pulses to said second grid, and said clamp circuit means comprises a source of a negative voltage, a diode, means connecting the cathode of said diode to said second grid, and means connecting the anode of said diode to said source of negative voltage, whereby said second grid is clamped to the potential of said source of negative voltage in the intervals between said gating pulses.

5. The receiver of claim 4 in which said means connecting said anode of said diode to said source of negative voltage comprises a resistor, whereby in the absence of said control voltage said amplitude varied gating pulses having sufficient amplitude to cause grid conduction at said second grid, whereby the flow of current to said second grid produces a voltage drop across said resistor to cut off said first amplifier in the intervals between said gating pulses.

6. The receiver of claim 3 in which said second amplifier is a triode, comprising means for applying said control voltage to the control grid of said triode, capacitor coupling means for applying said gating pulses with negative polarity to said control grid, and capacitor coupling means for connecting the anode of said triode to said input circuit of said first amplifier.

7. The receiver of claim 3 wherein said clamp circuit means comprises a source of a variable clamping voltage, a diode for applying said clamping voltage to said input circuit, and a resistor connected between said diode and said source of clamping voltage.

References Cited

UNITED STATES PATENTS

| | | | |
|---|---|---|---|
| 2,766,321 | 10/1956 | Parker | 178—5.4 |
| 2,880,266 | 3/1959 | Parker | 178—5.4 |
| 2,908,748 | 10/1959 | Macovski | 178—5.4 |
| 3,136,846 | 6/1964 | Macovski | 178—5.4 |
| 3,148,243 | 9/1964 | Wiencek | 178—5.4 |

JOHN W. CALDWELL, *Acting Primary Examiner.*

DAVID G. REDINBAUGH, *Examiner.*

J. A. O'BRIEN, *Assistant Examiner.*

UNITED STATES PATENT OFFICE

CERTIFICATE OF CORRECTION

Patent No. 3,342,930 September 19, 1967

Gerrit Kool

It is hereby certified that error appears in the above numbered patent requiring correction and that the said Letters Patent should read as corrected below.

Column 2, lines 18 and 19, for "element variable" read -- element. A variable --; line 66, for "turned" read -- tuned --; column 4, line 4, for "demondulation" read -- demodulation --.

Signed and sealed this 17th day of December 1968.

(SEAL)
Attest:

Edward M. Fletcher, Jr. EDWARD J. BRENNER
Attesting Officer Commissioner of Patents